Feb. 15, 1944.   N. L. DAVIS   2,342,038
AUTOMATIC CONVEYER
Filed June 20, 1942   6 Sheets-Sheet 1

Inventor
Nelson L. Davis
by Parker & Carter
Attorneys

Feb. 15, 1944.      N. L. DAVIS      2,342,038
AUTOMATIC CONVEYER
Filed June 20, 1942      6 Sheets-Sheet 2

Inventor
Nelson L. Davis
by Parker & Carter
Attorneys

Feb. 15, 1944. N. L. DAVIS 2,342,038
AUTOMATIC CONVEYER
Filed June 20, 1942 6 Sheets-Sheet 3

Fig. 5

Inventor
Nelson L. Davis
by Parker & Carter
Attorneys

Feb. 15, 1944.    N. L. DAVIS    2,342,038
AUTOMATIC CONVEYER
Filed June 20, 1942    6 Sheets-Sheet 4

Inventor
Nelson L. Davis
by Parker & Carter
Attorneys

Feb. 15, 1944.   N. L. DAVIS   2,342,038
AUTOMATIC CONVEYER
Filed June 20, 1942   6 Sheets-Sheet 6

Inventor
Nelson L. Davis
by Parker & Carter
Attorneys

Patented Feb. 15, 1944

2,342,038

UNITED STATES PATENT OFFICE 2,342,038

AUTOMATIC CONVEYER

Nelson L. Davis, Chicago, Ill., assignor to Link-Belt Company, Chicago, Ill., a corporation of Illinois Application June 20, 1942, Serial No. 447,807

20 Claims. (Cl. 198—143)

My invention relates to improvements in automatic conveyers and has for one object to provide a new and improved form of conveyer which will receive, transport and discharge free flowing solid material.

Other objects are to provide a conveyer, which will handle solid material with a minimum of degradation; use a minimum of power; which will include manually, semi-automatically or full automatically operating means for discharging materials from the buckets or for preventing overloading receiving chute or bin.

Other objects are to provide in combination with such a conveyer, discharge control mechanism whereby one or more discharge receptacles or conduits may simultaneously be supplied with the proper amount of material during continuous operation; and to combine in a single unit the functions of conveyer, feeder and discharger.

Other objects will appear from time to time throughout the specification and claims.

My invention is illustrated more or less diagrammatically in the accompanying drawings, wherein—

Like parts are indicated by like characters throughout the specification and drawings.

1, 2, are two arms of a continuous conduit, joined at one end by a closed housing 3, rigidly attached to the arms 1, 2, and at the other end by a housing 4 which has sleeve extensions 5, telescoping with the arms 1, 2. The arms 1, 2, and the housing 3 are rigidly mounted on a framework shown diagrammatically at 6. The housing 4 is slidably mounted on the sub-frame 7 and as will hereinafter appear, slack in the conveyer chain is taken up by longitudinal movement of the housing under the impulse of the counterweight 11 connected by cable 8 passing over pulleys 9 and 10 with the housing 4.

12 and 13 are conveyer chain sprockets, one each in the housings 3 and 4. 14 is an endless conveyer chain illustrated diagrammatically in Figure 1 by dash lines, traveling over the sprockets 12, 13 and carrying conveyer buckets as will hereinafter appear. The shaft 15 journaled at 16 and 17 carries rigidly mounted thereon, a drive gear 14 and a conveyer sprocket 12. 18 is a pinion in mesh with the gear 14 driven through a reduction gear 19 from a motor 20. The sleeves 5 permit movement of the housing 4 without breaking the dust seal and without opening the conduit. The branches 1, 2 and the housings 3, 4 have floors 28 and side walls 26, 27 and are closed at the top by a removable cover shown diagrammatically at 21. 22 is a feeder housing mounted on the cover 21 of the branch 2 and is adapted to receive material through any suitable supply pipe 23. The housing 22 has a hopper 24 and a cover 25.

Spaced inwardly from the side walls 26, 27 are track strips 29 supported on webs 30 projecting inwardly from the side walls, thus ample clearance is left between the walls 26 and 27 and the track strips 29. Conveyer buckets 31, some or all of them, having roller shafts 32 which carry flanged wheels 33 to travel along the track strips 29, have upwardly extending flanges 34 to engage links 35 or 36 of the chain 14, there being one link for each bucket. The links are articulated by pintle pins 37 so as to make a continuous drive chain propelling and supported on the buckets 31. The chain 14 travels around the sprockets 12 and 13 and is always supported above the level of the buckets and above and to one side of the material contained in the buckets. This prevents abrasion and clogging of the chain.

Each bucket includes two hoppers 38 and 39; the front wall of each hopper 38 is masked by the lip 40 extending rearwardly from the back hopper 39 of the preceding bucket so that when the buckets are in line they present a continuous surface, the lip of each preceding bucket overlying the adjacent wall of the succeeding bucket. This overlap is effective always whenever the chain is traveling along a straight line. It is not the case with respect to travel around the sprockets 12 and 13 because the chain is adjacent the inner body of the conduit and as the chain travels around the sprockets 12 and 13, the buckets spread apart.

Figures 3, 4:
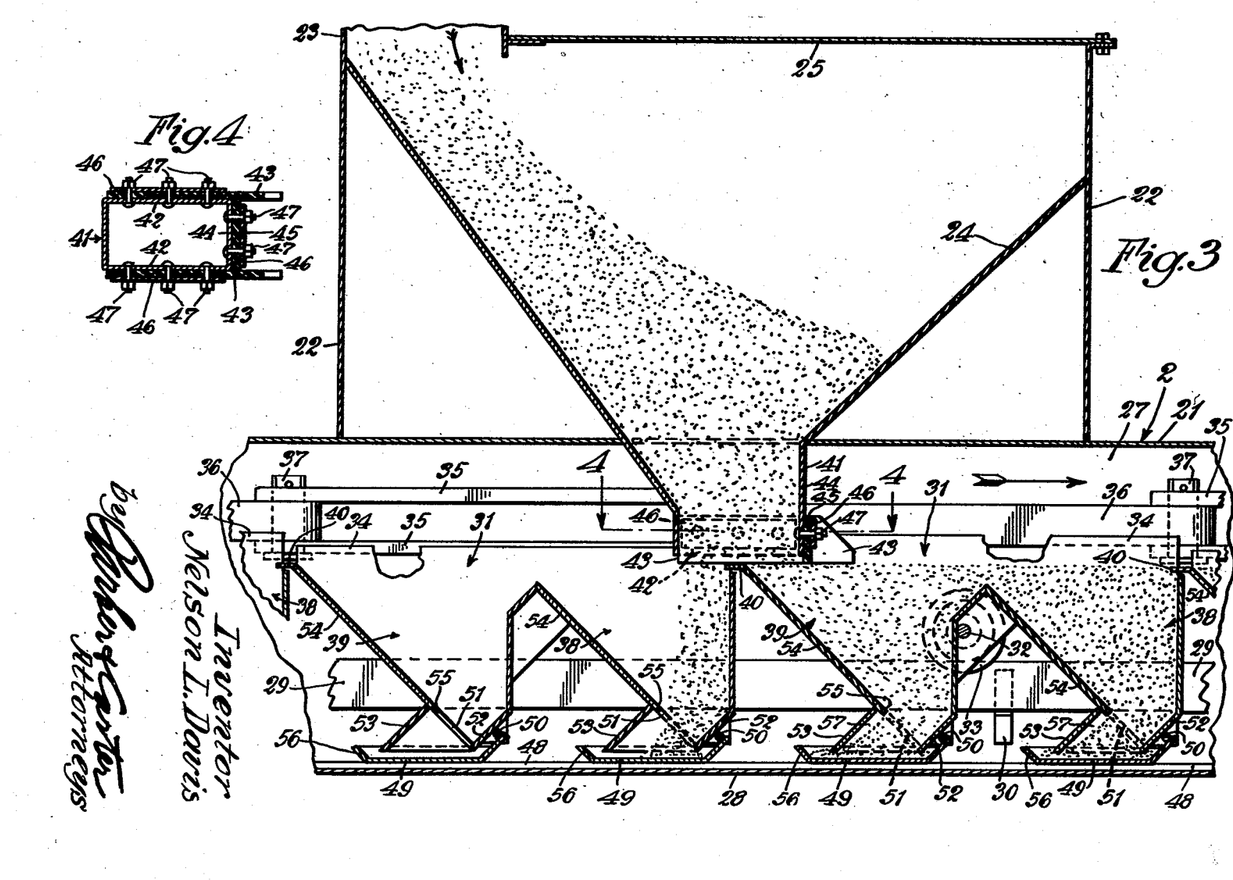
Figure 3 is a section on an enlarged scale along the line 3—3 of Figure 1.
Figure 4 is a section along the line 4—4 of Figure 3.

This characteristic of the chain and buckets limits the position of the feed housing 22. It can be anywhere in the system except where the chain is traveling around the sprocket. The feed housing as shown in Figure 3 contains the hopper 24 having a downwardly extending discharge spout 41 terminating just above the upper surface of the lip 40. The spout 41 has side walls 42 carrying downwardly extending flexible scraping members or squeegees 43 which may actually come in contact with the lip 40. The downstream spout wall 44 has a squeegee 45 which comes down to just touch the lip 40. The squeegees 43 and 45 may be of rubber as indicated, held in position by strips 46, and nut and bolt combinations 47 or may be of any other suitable flexible material. If desired, the spout 41 may come down almost to contact with the lip 40, preferably, however, in order to avoid binding, it is well to have some flexible medium between the lower end of the spout and the lip 40.

As the conveyer buckets are moved in the direction of arrows shown in Figure 3, with the hopper 24 containing a sufficient supply of material, the material flows through the spout 41 to fill each successive bucket as it passes beneath the spout, the size of the spout being sufficient with respect to the speed of bucket travel so that by the time the bucket has passed the spout, the bucket will be filled level. Surcharging or overfilling of the bucket is impossible because as the material fills the bucket and banks up in the spout, the actual contact of the squeegees 43 and 45 provides a closed system to prevent any appreciable overflowing of the material. Thus each bucket is level filled and goes forward in a level filled condition after it has left the feed spout.

Wear strips 48 are disposed along the floor 28 of the conduits. These wear strips support bucket gates 49, pivoted at 50 on the under forward sides of each of the bucket hoppers 38 and 39. The bucket hoppers have triangular bottom discharge ports 51 extending upwardly from the lower edges of the downwardly and rearwardly inclined walls 52 which mask the pivot axes of the bucket gates. 53 is a shield or shroud extending rearwardly and downwardly from the inclined wall 54 of each bucket hopper and conforming in cross section as indicated in Figure 5 to the discharge opening 51, the shield, however, projecting rearwardly from the wall 54 a slight distance above the discharge opening as indicated at 55 to provide a certain amount of clearance between the normal line of flow of material passing through the port 51 and the shroud 53.

Figure 5:
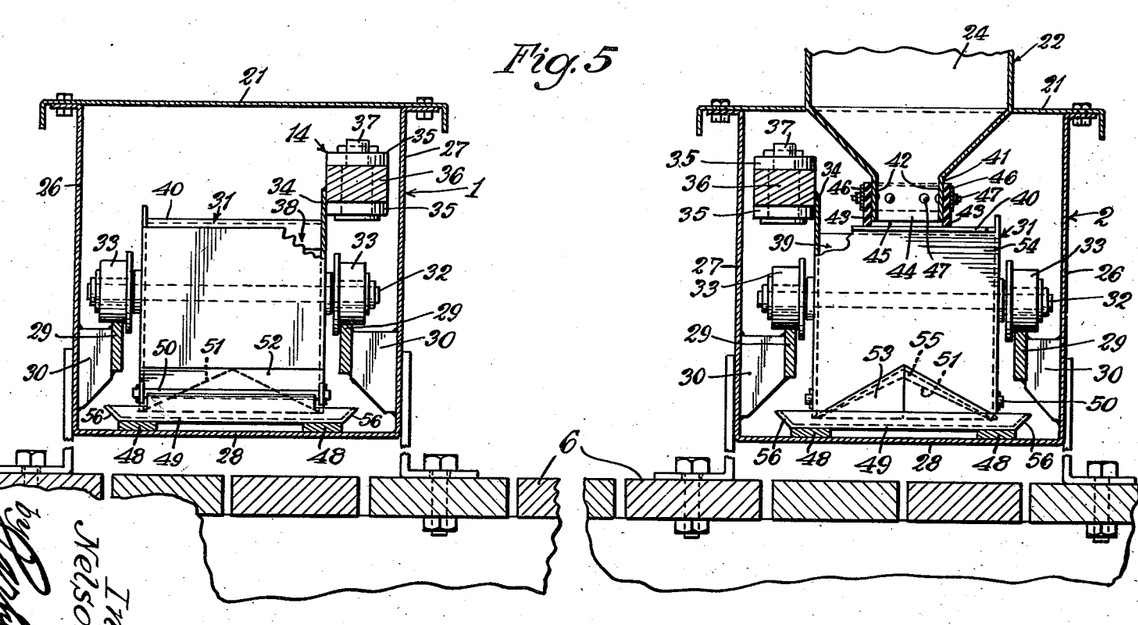
Figure 5 is a section on an enlarged scale along the line 5—5 of Figure 2.

The gate 49 resting on the wear strips 48 is normally out of contact with the underside of the bucket hopper, as shown in Figures 3 and 5. The gate 49 is dish-shaped having upwardly and outwardly extending inclined walls 56. The slope of the shroud 53 is substantially equal to the angle of repose of the material discharged through the port 51 so that under ordinary circumstances, there is a clearance at 57 between the shroud 53 and the material. If this clearance were not present, upward movement of the gate 49 with respect to the bucket would not be possible without jamming, lifting the bucket off its wheels, or crushing the material. When the gate 49 is rotated upwardly the material between the bucket and the gate may be forced into the clearance without any harm being done. The shroud 53 and the inclined wall 52 all terminate within the area bounded by and slightly below the outer edges of the gate 49, thus while there might under some circumstances be a slight up pressure or up-flow of the material around this area within the periphery of the gate, such up-flow is not sufficient to cause spillage of material about the periphery of the gate 49.

If there were no discharge from the conduit and if the wear strips 48 were continued throughout and if the buckets traveled around with material being fed to the hopper 24, a situation would ultimately ensue where the whole system, that is, every bucket would be filled. When that situation prevailed, then there would be no outflow from the hopper 24 into the buckets. The buckets would merely pass beneath the hopper, the mass of material in the buckets would maintain a continuous closure to prevent outflow from the chute 41 and the buckets would continue to operate without any binding or jamming or spillage of material.

Spaced along the conduits 1 and 2, are a plurality of discharge hoppers 58. There may be one or more and they may be associated with conduit 1 or 2 or both. These discharge hoppers are especially well illustrated in Figures 10 and 11. The floor 28 and the wear strips 4 terminate at the upstream and downstream sides of the hopper 58. The hopper has inclined floors 60, 61, discharging into a chute 62 which may be controlled by a manually adjusted sliding gate 63 or by any suitable means as desired. Extending across the hopper in general alignment with the wear strips 28, are two or more fixed discharge cams 64. At each end the upper surface of these cams 64 are in horizontal alignment with the upper surfaces of the wear strips 48. Intermediate their ends, the cam surfaces 65 cause gradual opening and then gradual closing of the gates 49 as the bucket travels to the right. This is important because if the gates ever suddenly opened and closed as the buckets pass along, shock on the mechanism would cause excessive wear and violent movement of the gates would tend to throw the material and thereby cause degradation and deposit on the conduit floor.

If only the cams 64 were provided, each bucket as it passed over the hopper would spill its load until the discharge hopper 59 was full. To insure adequate supply and proper control, it is desirable that the maximum capacity of the conveyer to supply the discharge hopper 60 be greater than the means for withdrawing material therefrom. In the absence of some separate control means the discharge hopper would gradually fill up and the level of material would rise above the cam surfaces 65, the doors 49 would drag along the surface of the material and an excess amount of material would be scraped forwardly into the downstream side of the conveyer conduit. This would result in clogging the conveyer conduit, thereby increasing the power required, perhaps even preventing bucket movement and would result in excessive degradation of the material.

Figures 10, 11, 12:
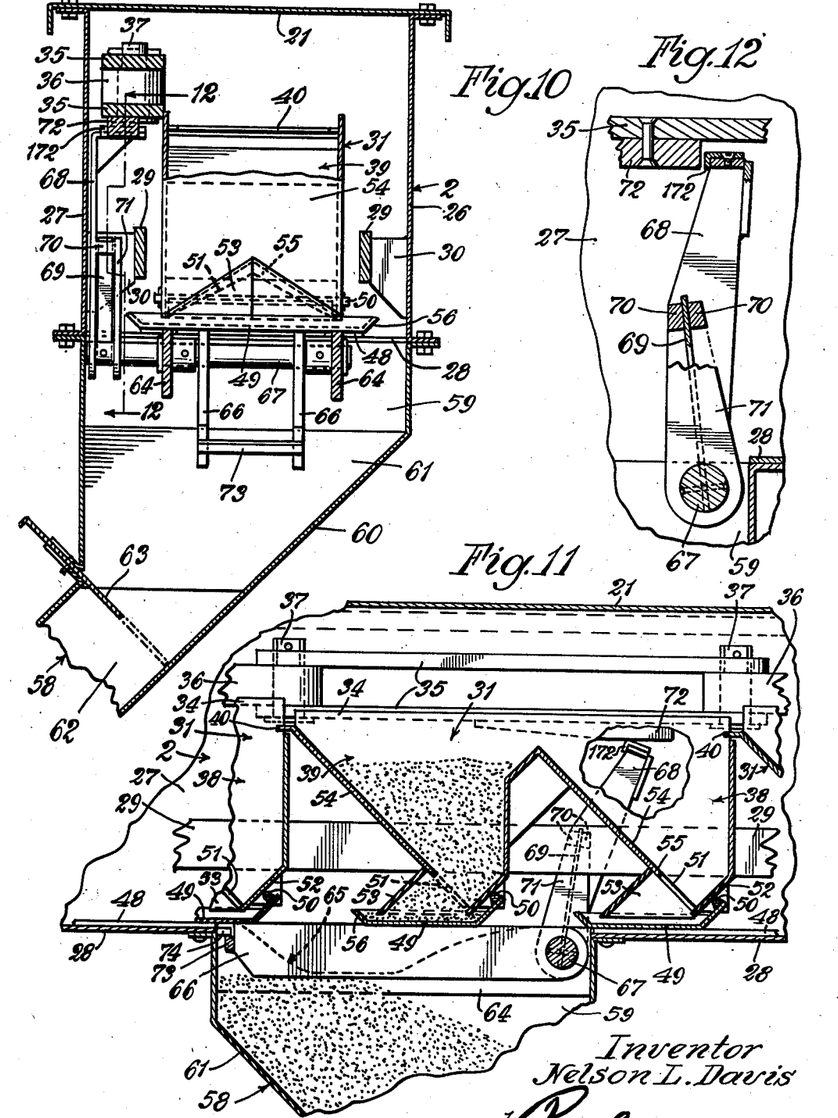
Figure 10 is a section along the line 10—10 of Figure 6.
Figure 11 is a section similar to Figure 8 except that the parts are shown in a different position.
Figure 12 is a section along the line 12—12 of Figure 10.
Figure 13:
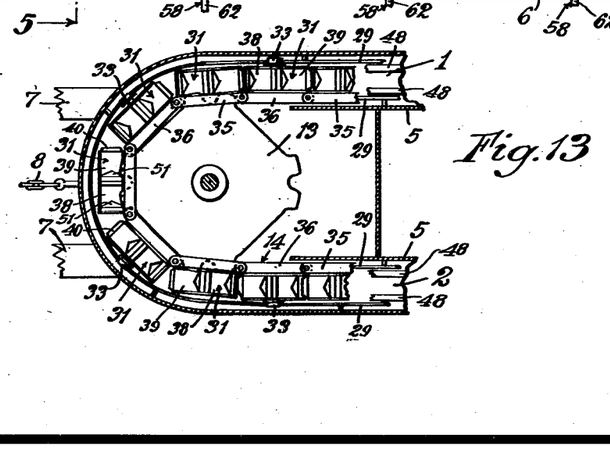
Figure 13 is a plan view in part section of the idler end of the conveyer.

To prevent such overcharging of the hopper 59 movable control arms 66 pivoted on shafts 67 are provided, in each hopper located in parallelism with the members 64. A lever arm 68 forked at 71 is pivoted on each shaft 67, a spring 69 is rigidly mounted in the shaft 67 between and engaging the ears 70 joining the lever 68 and fork 71. Cams 72 are suitably spaced along the chain and are removable from the chain for replacement if necessary. On the end of each of the levers 10 is a removable wear plate 172. The cams 72 contact this wear plate as the chain travels along and raises the control arms 66 into the upper position as shown in Figure 11 under which circumstances, the gates 49 will travel along the bars and no discharge will take place.

Figures 8, 9:
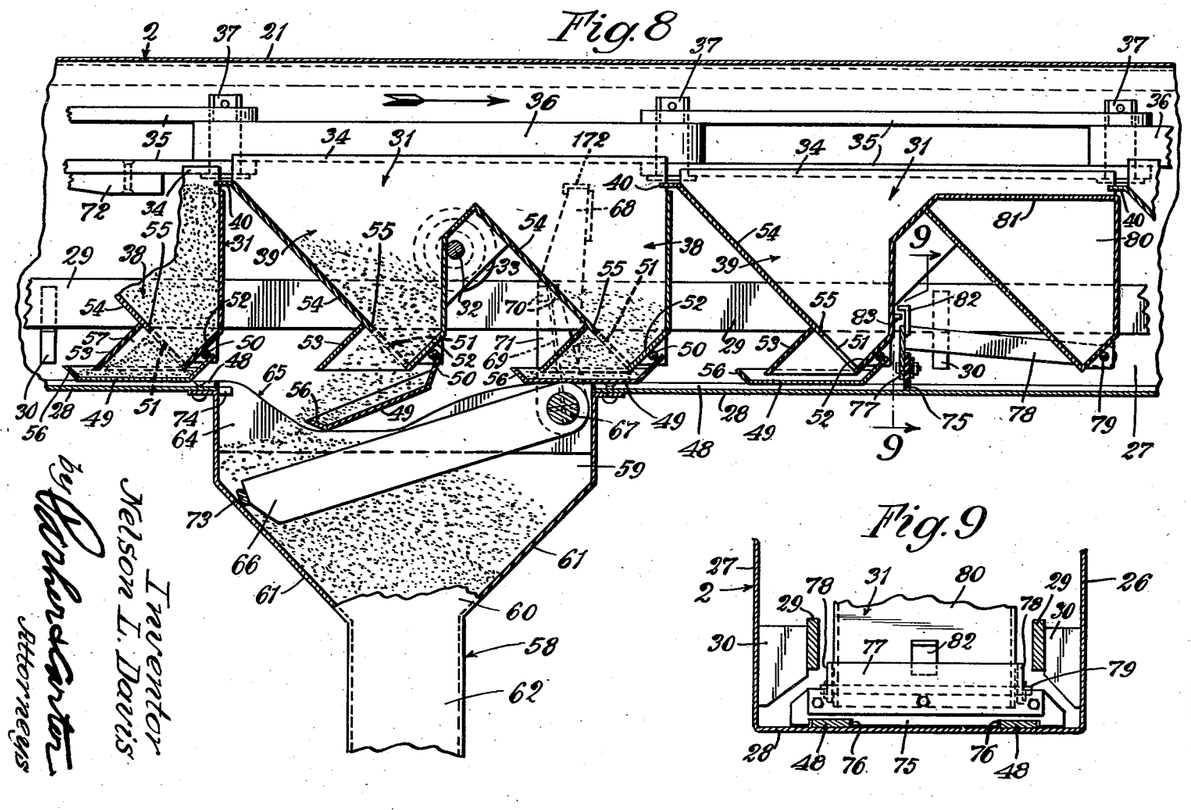
Figure 8 is a section similar to Figure 6 on an enlarged scale.
Figure 9 is a section along the line 9—9 of Figure 8.

Unless the discharge hopper is full, the arms 66 will as soon as the cam has passed on, assume the position shown in Figure 8 and then whenever a bucket passes over the discharge hopper, the gate 49 will open and the bucket will discharge, tending to fill the hopper 59, this will continue until the discharge hopper 59 is full. When the hopper 59 is substantially full, as soon as one of the cams 72 engages the lever 68, the arms 66 will be raised to the position shown in Figure 11. It is easy enough for the arms 66 to come up through the loose material in the discharge hopper but if the material in the discharge hopper has reached such a position as is shown in Figure 11, when the cam 72 passes on, the arms 66 will rest upon, and be held in the raised position by the material in the hopper and no further discharge will take place from the buckets as they pass over.

This situation prevails until as the material is drained out of the discharge hopper, the arms 66 will tend to fall through an intermediate partial discharge position to the maximum discharge position shown in Figure 8.

As the bucket discharges, the gate 49 will be gradually closed by contact with the arms 66 or the cams 64. By coordinating the number of cams on the chain with the bucket capacity, the rate of bucket travel and the rate of withdrawal from the discharge hopper, a position of equilibrium can be obtained at which each discharge hopper will be kept continuously supplied with the proper amount of material and no discharge hopper will fill up fully enough before a cam goes by to cause any piling up of material and scraping off of material into the conduit.

73 is a cushion plate on the ends of the arms 66 adapted to engage a fixed stop 74. The spring 69 cushions the blow so that too violent action of the arms 66 is prevented. The clearance beneath the shield 53 permits the closure of the gate 49 even though the bucket still contains material which might otherwise be discharged.

There is, of course, always the possibility that a certain amount, usually a very small amount, of material may find its way into the conduit itself beneath the buckets. In order that such material may be quickly removed, a scraper blade 75 is provided, preferably of rubber or other flexible similar material. It is notched at 76 to straddle the wear plates 48, is supported on a rigid blade 77, which blade is supported on arms 78 pivoted on a shaft 79. The shaft 79 is associated with a dummy bucket hopper 80 which is closed at its top as indicated at 81. This blade travels across the hopper being limited in its downward movement by the stop 82 engaging a lug 83 so that whatever loose material is found in any part of the conduit 30 will be scraped along to discharge at the next discharge hopper.

Figures 1, 2:
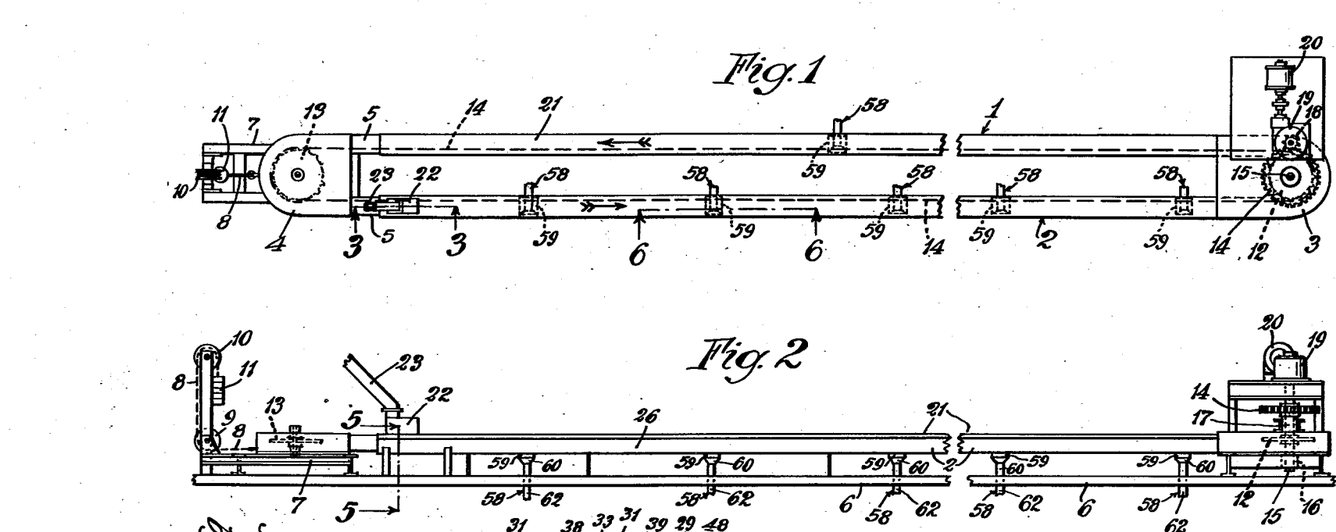
Figure 1 is a diagrammatic plan view.
Figure 2 is a diagrammatic side elevation.
Figures 6, 7:
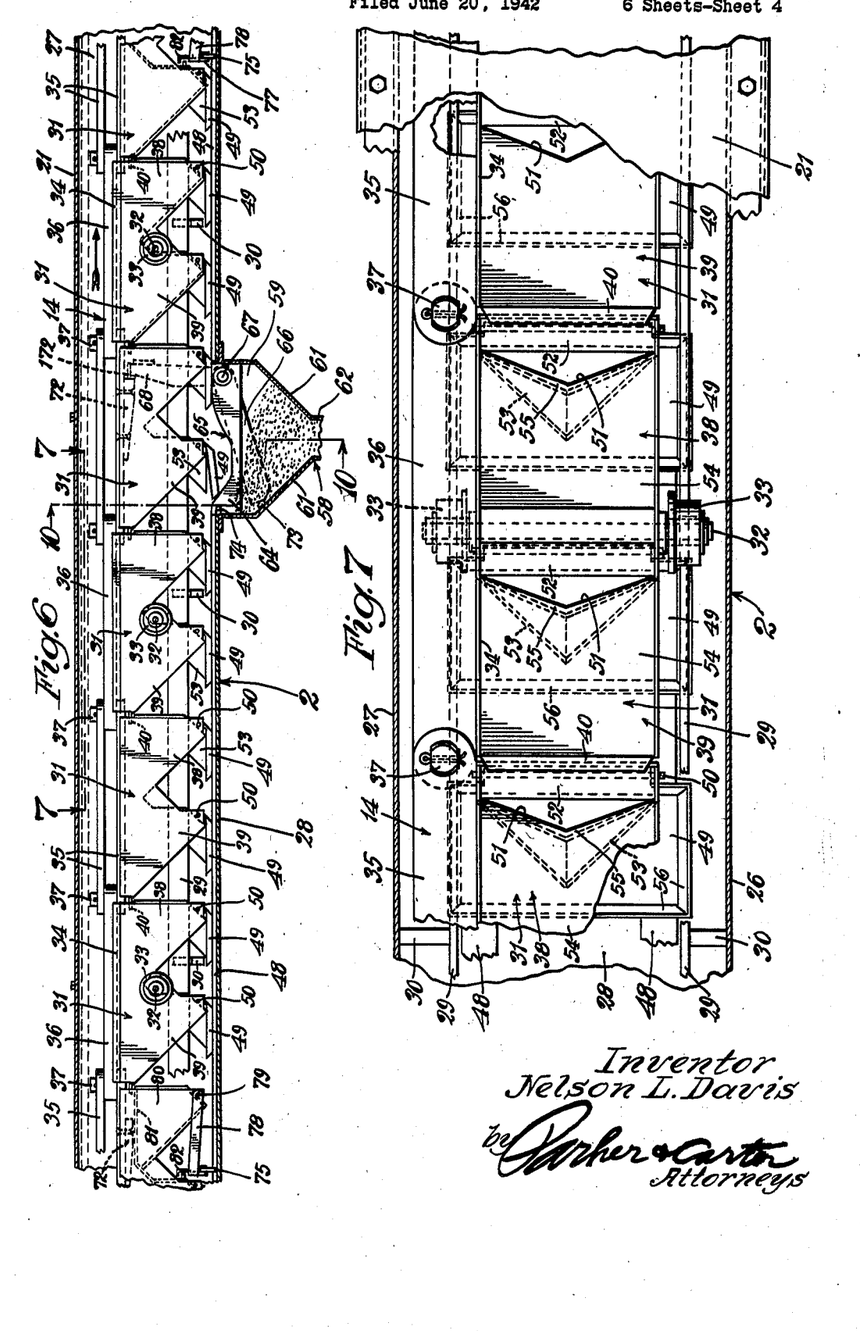
Figure 6 is a section on an enlarged scale along the line 6—6 of Figure 1.
Figure 7 is a section along the line 7—7 of Figure 6.

The use and operation of my invention are as follows:

With the conveyer empty, the motor may be started and the chain will travel through the continuous conduit in the direction indicated by the arrows on Figures 1, 3 and 6. Under these circumstances each bucket gate as it passes over one of the discharge hoppers or stations will be eased down to and then gently eased up from the dumping or discharge position. During the remainder of the travel of each bucket, the gate will rest and travel along the bottom of the conduit or tracks projecting upwardly from the conduit bottom. Periodically the cams on the chain will engage the discharge control levers and move them to the up position but because there is no material in the discharge hoppers, as soon as the cam passes by, the discharge control arms drop back to the maximum discharge position.

When material is fed to the supply hopper, each bucket as it passes under the loading spout will be fully or partially filled. No more than a full bucket quantity, however, can be supplied because as soon as the bucket is full, the material in the bucket backs up to close the loading spout and prevent further discharge therefrom. No material spills between the buckets because the lip of one bucket overhangs the front wall of the bucket immediately back of it. No material spills over the sides of the buckets because the loading spout is narrow enough with respect to the bucket width to prevent spillage.

Each bucket as it travels forwardly will reach each discharge station or hopper. The bucket gate will no longer be held in closed position, but will be free to gently lower to discharge position, and the bucket will discharge all or part of the material contained therein. This situation prevails until one of the discharge controlling cams engages the discharge control lever and raises the bucket gate control arms upwardly, through the material contained in the discharge hopper, thus forming a continuation of the conduit bottom or wear plates and causing the bucket doors to travel across the discharge stations without any discharge. As soon as the cam has passed on if the hopper is empty the arms will again assume the discharge position but if the hopper or discharge station is full the arms will rest on the material therein and no more material will be discharged at that particular station until sufficient material has been withdrawn therefrom to permit the control arms to lower to discharge position.

Inherent in the operation of the apparatus is the fact that the rate of possible supply of material by the buckets is greater than the rate of maximum possible discharge at any individual discharge station. As a result each discharge station is rapidly filled and as soon as it is filled, material is no longer discharged at that point but goes on to discharge at some one of the succeeding discharge stations. Supply at the various discharge stations under normal operation is such that it is usually intermittent and the result is that at an early stage in the proceedings all the discharge stations will receive a sufficient supply of material to fill them and thereafter they will be maintained practically filled because there will always be in the circulating system, buckets containing sufficient material to supply the demand of any and all stations needing replenishment. Thus the system furnishes a continuous bulk storage of material always on call and ready for immediate discharge as required.

Habitually the apparatus is set to control and operate so that a single bucket seldom completely discharges at one discharge station. Usually the material at the discharge station is at such a level that the control arms float on the material somewhere between maximum discharge and no discharge position and usually an individual bucket will pass over several discharge stations before it spills all of its contents.

The conduit is closed in this case but may be open. Material is fed into it through a loading spout, hopper and chute. Material is discharged from the conduit through a closed supply hopper and chute. Travel of the buckets is relatively slow so wind currents are not set up in the conduit. As a result of this, there is little if any vibration and because each bucket carries its measured load of material and because the material flows and does not drop into the buckets and because the material flows out of the buckets into the discharge hoppers instead of dropping, there is practically no degradation of the material. There is no rubbing or grinding as is common with certain types of bulk flow conveyers.

The only time the continuous upper surface of the conveyer bucket chain is disturbed is when the bucket chain passes around the end sprocket. At this time the overhanging flange or lip of the front bucket angularly departs from the forward wall of the rear bucket but this does no harm because the material is by the arrangement of the feed spout maintained level with the top of the buckets and does not pile up, so when adjacent buckets angularly separate no material drops into the space between them.

These is, of course, always the possibility that vibration or defective operation of the apparatus or some other cause may result in the deposit on the floor of the conduit of some undesired, unexpected material. If this takes place, such material is immediately scraped along the floor to the next discharge hopper and immediately discharged from the system.

Under ordinary circumstances no moving parts are allowed to come together and compress material directly between them. One exception, of course, to this is the feed spout where the rubber or flexible spout lips actually can engage the upper surfaces of the overhanging bucket lips, but this arrangement is such that little if any material is compressed between the bucket lips and the spout lips. The rubber squeegees tend to brush the material off this surface. With respect to the discharge, there is clearance between the dish-shaped bucket gates and the chute defined by the shroud enclosing the discharge port. Under no circumstances of ordinary operation does there ever occur any contact between the surface of the bucket door or gate and the bucket except along the pivot axis. Flow is prevented because the clearance between the bucket plate or gate and the discharge spout leading from the bucket is sufficient to insure that the angle of repose will prevent flow.

The shroud enclosing the discharge stream from the bucket port under ordinary circumstances never runs full because the shroud is spaced above the upper boundary of the port and is on an angle substantially the same as the angle of repose of the material. The bucket gate is in the closed position normally horizontal and intercepts the flow of material from the port through the shroud. The position of the bucket gate is such that it does not touch the lower edge of the shroud but the walls of the bucket gate expand up above the plane defined by the lower boundaries of the shroud. When the gate is opened, the material runs out through the shroud across the bucket gate. As the bucket gate is closed, flow is intercepted and gradually decreases until it entirely stops. The upward movement of the bucket gate backs up the flowing stream. The clearance between the stream and the shroud is sufficient to compensate for the upward movement of the gate and so prevent jamming of material in the shroud, thus assisting to prevent degradation which might result from crushing of the material grains among themselves or from crushing of the material between the metal surfaces of shroud and gate, there being no such metal to metal contact and clearance in the shroud; opening and closing of the gate results in a minimum of degradation.

In dealing with materials of the type for which this apparatus is primarily intended, it is important that no violent motion, no impact be imparted to the material. If the bucket gate were allowed to drop suddenly as it passed over the discharge hopper, the material might be violently projected downwardly into the discharge hopper and especially as the bucket passes over the downstream edge of the hopper, the gate might be violently and suddenly snapped shut. This would tend to toss the material upwardly and tend to cause a dusty condition which might easily result in an excess amount of the material being carried along the conduit beyond the discharge hopper.

The arrangement shown including the cam shaped limiting guide bars and the angularly movable discharge control arms insures that at the wide open position and at all intermediate positions up to the closed position, the action of the bucket door will be smooth and gradual and there will be no catapulting or violent projection of the material by the opening or closing of the door.

The chain while it moves slowly, moves at a constant rate of speed and each cam when it contacts the gate control lever may hit it a very sharp blow. This blow is cushioned by the spring connection between the bucket discharge control bars and the lever, and the yielding impact member on the bucket control arms, cushions the shock when the arm is thrown suddenly to its upper position as shown in Figure 11. These two cushioning features, namely—the spring and the cushion plate or member, limit vibration and impact to a point which is not deleterious to the apparatus or to the material being handled.

If it is desired to take one or more of the discharge hoppers out of operation, all that is necessary is to close the manually controlled discharge valve. The hopper will then fill up until such a point is reached that the gate control arms are cushioned on and supported by the material in the hopper after they have been raised to the closed position by the passage of one of the cams. Thereafter, until material is withdrawn from the discharge hopper no more material can be fed to that particular hopper because the gate control arms hold each successive bucket gate in closed position.

It is important that the spacing of the cams with respect to the rate of discharge of material from the hoppers and with respect to the linear rate of travel of the chain be such that a cam comes by and raises the gate control arms to the closed position sufficiently often so that there is not time between successive cams for the hopper to fill up beyond its normal capacity. Once the hopper is full, the control arms, when raised by the cam will rest on the surface of the material in the full hopper, no further material can be fed to the hopper and material can never be piled up or overloaded, the hopper is never surcharged, and the bottom of the bucket gate never comes into direct contact with material in the hopper. The bucket gate can thus never serve as a scraper or wiper to convey material from an overcharged discharge hopper into the conveyer conduit beneath or in front of the bucket gate.

While I have illustrated a long link chain with a relatively long bucket attached to each link, each bucket having two hoppers and two discharge gates, the effect desired might equally well be obtained by a different type of bucket and the two hopper bucket, is to be regarded as merely illustrative and an effort to obtain maximum capacity with minimum weight. Because of the fact that the conduit must be kept closed and because of the fact that the buckets pass through the entire area of the conduit, a special type of take-up is needed, the conduit having commenced telescoping with respect to the fixed conduits so that as the take up moves under tension of the counterweight to compensate for wear in the chain, the conduit remains continuous and closed.

The material is continuously traveling through the conduit system in separate self-contained and separately supported batches. The material in each bucket is supported, conveyed and carried without any frictional effect applied to the material. The only frictional resistance to the whole operation of the conveyer, except for the mechanical working resistance of bearings, etc., is that between each bucket gate or door and the wear strip but because the bucket gate is pivoted below the bucket and because the discharge from the bucket is through a comparatively small opening, the gate does not support the entire column of material in the bucket. It only supports that part of it actually overlying the bucket with the additional pressure applied thereto caused by the pressure of material in the bucket and much of this pressure is supported on the inclined surfaces 52 and 54.

While the buckets are enclosed in a conduit having a closed bottom with wear strips to protect the apparatus and the material, it will be understood that the conduit might be omitted or it might have an open bottom. The essential thing is that the wear strips or tracks along which the bucket gates are delivered and by which they are kept in the open position must be continuous throughout the system except where discharge is to take place. The individual buckets carry uniform successive batches of material from the loading to the discharging zones or stations and there is, as a result a minimum of degradation and no rubbing or abrasion of the material as it is conveyed.

I claim:

1. A conveyer including a bucket having a bottom discharge aperture, a gate controlling said aperture, means for holding the gate normally in closed position, a discharge station along the path of travel of the bucket, means associated with the discharge station for first opening the gate as it enters the station and for then closing the gate as it leaves the station, means associated with the discharge station and independent of the gate opening means for separately holding the gate closed as it passes through the discharge station, said means including a movable arm and means for moving it into and out of position to engage the gate and hold it closed, the means for moving the arm into the gate closing position including a cam movable with the bucket and adapted as it passes through the discharge station to move the arm into bucket closing position.

2. A conveyer including a bucket having a bottom discharge aperture, a gate controlling said aperture, means for holding the gate normally in closed position, a discharge station along the path of travel of the bucket, means associated with the discharge station for first opening the gate as it enters the station and for then closing the gate as it leaves the station, means associated with the discharge station and independent of the gate opening means for separately holding the gate closed as it passes through the discharge station, said means including a movable arm and means for moving it into and out of position to engage the gate and hold it closed, the means for moving the arm into the gate closing position including a cam movable with the bucket and adapted as it passes through the discharge station to move the arm into bucket closing position, a discharge hopper associated with the discharge station and adapted to receive material from the bucket, the bucket gate closing arm being so positioned in the hopper that when the hopper is full, the arm when once raised to the bucket closing position rests upon the material and is held in the bucket closing position independent of the cam.

3. In combination, a conveyer system including a plurality of movable buckets, means at some point in the system for filling each bucket level full, a discharge hopper adjacent the path of the buckets and adapted to receive material discharged from successive buckets as they pass adjacent the hopper, bucket discharge preventing means associated with the hopper normally in inoperative position, periodically operative means for moving the bucket discharge preventing means into operative position, said discharge preventing means being adapted to rest upon the material in the hopper and be held thereby in operative position when the hopper is full.

4. In a conveyer, a bucket, means for filling it from the top, a discharge port at the bottom of the bucket, a gate associated with the bucket beneath the port, a shroud projecting downwardly from the bottom wall of the bucket to form a chute closed by the gate, the cross sectional area enclosed by the shroud being greater than the cross sectional area of the port.

5. In a conveyer, a bucket, means for filling it from the top, a discharge port at the bottom of the bucket, a gate associated with the bucket beneath the port, a shroud projecting downwardly from the bottom wall of the bucket to form a chute closed by the gate, the cross sectional area enclosed by the shroud being greater than the cross sectional area of the port, means for moving the gate into and out of closed position, the gate being at all times out of actual contact with the bucket wall and the shroud.

6. In a conveyer system, an endless chain, a series of successive conveyer buckets attached to and adapted to travel with the chain, the buckets projecting laterally all in the same direction from one side of the chain, guide wheels about which the chain travels, the axes of rotation of the guide wheels being on the side of the chain opposed to the buckets, each bucket in the system being in overlapping relationship with the buckets on either side of it at all times except when the chain is traveling around the sprockets, means for filling the buckets from above in a continuous stream, means associated therewith for limiting the fill of the buckets to level filling.

7. In a conveyer system, an endless chain, a series of successive conveyer buckets attached to and adapted to travel with the chain, the buckets projecting laterally all in the same direction from one side of the chain, guide wheels about which the chain travels, the axes of rotation of the guide wheels being on the side of the chain opposed to the buckets, each bucket in the system being in overlapping relationship with the buckets on either side of it at all times except when the chain is traveling around the sprockets, means for filling the buckets from above in a continuous stream, means associated therewith for limiting the fill of the buckets to level filling, a track extending beneath the buckets throughout their entire travel, each bucket having a bottom discharge aperture, a gate associated with each bucket movable therewith traveling along the track and held by the track in flow preventing position.

8. In a conveyer system, an endless chain, a series of successive conveyer buckets attached to and adapted to travel with the chain, the buckets projecting laterally all in the same direction from one side of the chain, guide wheels about which the chain travels, the axes of rotation of the guide wheels being on the side of the chain opposed to the buckets, each bucket in the system being in overlapping relationship with the buckets on either side of it at all times except when the chain is traveling around the sprockets, means for filling the buckets from above in a continuous stream, means associated therewith for limiting the fill of the buckets to level filling, a track extending beneath the buckets throughout their entire travel, each bucket having a bottom discharge aperture, a gate associated with each bucket movable therewith traveling along the track and held by the track in flow preventing position, a discharge hopper, the track being depressed in line with said hopper to cause opening of the bucket by gravity as the gate passes over the hopper.

9. In a conveyer system, an endless chain, a series of successive conveyer buckets attached to and adapted to travel with the chain, the buckets projecting laterally all in the same direction from one side of the chain, guide wheels about which the chain travels, the axes of rotation of the guide wheels being on the side of the chain opposed to the buckets, each bucket in the system being in overlapping relationship with the buckets on either side of it at all times except when the chain is traveling around the sprockets, means for filling the buckets from above in a continuous stream, means associated therewith for limiting the fill of the buckets to level filling, a track extending beneath the buckets throughout their entire travel, each bucket having a bottom discharge aperture, a gate associated with each bucket movable therewith traveling along the track and held by the track in flow preventing position, a discharge hopper, the track being depressed in line with said hopper to cause opening of the bucket by gravity as the gate passes over the hopper, additional track means and means for moving them into the path of the gate to prevent bucket opening movement.

10. In a conveying system, a closed conduit, a plurality of buckets having bottom discharge ports and means for propelling them along the conduit, means for filling the buckets, gates adapted to travel along the floor of the conduit and prevent discharge of material through the ports, there being at least one discharge aperture in the floor of the conduit, a cam member extending across the discharge aperture below the level of the conduit floor adapted to guide the gate downwardly toward opening position and subsequently as the bucket travels forwardly to raise the gate to closing position, the contour being such that gate movement from and toward the closing position is gradual and gentle, a hopper in close contact with the conduit adapted to receive the discharge from the bucket and means in the hopper separate from the cam means above referred to for holding the buckets in closed position as they travel across the discharge aperture, means operative in consonance with the travel of the buckets for periodically and intermittently moving said second bucket gate closing means into and out of open position.

11. In a conveying system, a closed conduit, a plurality of buckets having bottom discharge ports and means for propelling them along the conduit, means for filling the buckets, gates adapted to travel along the floor of the conduit and prevent discharge of material through the ports, there being at least one discharge aperture in the floor of the conduit, a cam member extending across the discharge aperture below the level of the conduit floor adapted to guide the gate downwardly toward opening position and subsequently as the bucket travels forwardly to raise the gate to closing position, the contour being such that gate movement from and toward the closing position is gradual and gentle, a hopper in close contact with the conduit adapted to receive the discharge from the bucket and means in the hopper separate from the cam means above referred to for holding the buckets in closed position as they travel across the discharge aperture, means operative in consonance with the travel of the buckets for periodically and intermittently moving said second bucket gate closing means into and out of open position, said means being adapted to rest on and be supported by the material when it piles up in the hopper, the means for moving said bucket closing means into the open position being inoperative when the means are supported by the material in the hopper.

12. In combination, a conveyer system including a closed conduit, a plurality of buckets and means for moving them along the conduit, the buckets having bottom discharge ports, a plurality of discharge apertures in the floor of the conduit, gates associated with the buckets movable therewith for preventing discharge through the ports, means associated with the discharge apertures for selectively opening or closing the bucket gates as they pass across the discharge apertures, means moving with the buckets adapted to scrape material which may be found on the floor, along the floor to discharge at the next successive discharge aperture.

13. A conveyer system including a series of buckets, means for conveying them in succession along a path, a discharge station on said path, said station including a receiving element having an outlet, and means for controlling the flow of material from the buckets to the discharge station in response to accumulation of material in said receiving element, and for thereby preventing filling of said receiving element above a predetermined maximum level, including a discharge gate for each bucket and an inhibiting member movably mounted in such receiving element, said member when in elevated position being adapted to prevent the opening of said discharge gate as it passes over the receiving element, and means responsive to the movement of the buckets for elevating said inhibiting member through the material in the discharge station receiving element, the material in the receviing element being adapted to prevent its downward movement when the material reaches a predetermined level in the receiving element.

14. In a conveyer system, a series of buckets and means for conveying them in succession along a predetermined path, a plurality of discharge stations arranged along a path, each such station including a receiving hopper having a discharge outlet the discharge capacity of which is less than the maximum delivery capacity of the buckets to the hopper, and means for controlling the bucket discharge to any specific discharge station, including a discharge gate for each bucket, movable members mounted at each hopper and adapted when in raised position to prevent the opening of the bucket gates as the buckets pass across the hopper, and means movable with the buckets for periodically elevating said members to raised position, the material in the hopper being effective, when it reaches a predetermined level, to support said members in raised position after they have been elevated by said movable means.

15. In a conveyer system, a series of buckets and means for conveying them in succession along a predetermined path, a plurality of discharge stations arranged along the path, each such station including a receiving hopper having a discharge outlet the discharge capacity of which is less than the maximum delivery capacity of the buckets to the hopper, and means for controlling the bucket discharge to any specific discharge station, including a discharge gate for each bucket, movable members mounted at each hopper and adapted when in raised position to prevent the opening of the bucket gates as the buckets pass across the hopper, levers associated with each said movable member, and lever contacting members, movable with the buckets, for periodically elevating said members to raised position, the material in the hopper being effective when it reaches a predetermined level, to support said members in raised position after they have been elevated.

16. In a conveyer system, a series of buckets and means for conveying them in succession along a predetermined path, a plurality of discharge stations arranged along a path, each such station including a receiving hopper having a discharge outlet the discharge capacity of which is less than the maximum delivery capacity of the buckets to the hopper, and means for controlling the bucket discharge to any specific discharge station, including a discharge gate for each bucket, movable members mounted at each hopper and adapted when in raised position to prevent the opening of the bucket gates as the buckets pass across the hopper, levers associated with each said movable member, and lever contacting members, movable with the buckets, for periodically elevating said members to raised position, the material in the hopper being effective, when it reaches a predetermined level, to support said members in raised position after they have been elevated, said contacting members being spaced along the series of buckets in predetermined relationship to the discharge capacity of the receiving hoppers, the delivery capacity of the buckets and the speed of movement of the bucket series.

17. In a conveyer system, an open-topped bucket and means for conveying it along a path, a discharge station positioned in said path, said bucket having a bottom opening and a movable closure element for said opening, movable with as well as in relation to the bucket, means for holding said closure element in closed position while the bucket is out of line with the station, said closure element being normally free to open when the bucket reaches the discharge station and means effective to inhibit the opening of said closure element when a predetermined accumulation of material has built up at the station, including an inhibitive member responsive to the level of the mass of material accumulated at the station, and adapted positively to inhibit movement of said closure element toward open position.

18. In a conveyer system, an open-topped bucket having a bottom discharge aperture, means for conveying the bucket along a path, a discharge station positioned on the path, and including a discharge member adapted to form, with the discharge aperture of the bucket, a discharge passage for the material in the bucket when the bucket is aligned with the discharge station, a movable closure member located in said discharge passage, said closure member being normally in the open position when the bucket is aligned with the station, and means responsive to the accumulation of material at said station, adapted to maintain said closure member in closed position when a predetermined amount of material has accumulated at the station, and for thereby positively preventing discharge from the bucket, said closure member, when in closed position, closing the bottom discharge aperture of the bucket.

19. In a conveyer system, an open-topped bucket having a bottom discharge aperture, means for conveying the bucket along a path, a discharge station positioned on the path, and including a discharge member adapted to form, with the discharge aperture of the bucket, a discharge passage for the material in the bucket when the bucket is aligned with the discharge station, a movable closure member located in said discharge passage, said closure member being normally in the open position when the bucket is aligned with the station, and means responsive to the accumulation of material at said station, adapted to maintain said closure member in closed position when a predetermined amount of material has accumulated at the station, and for thereby positively preventing discharge from the bucket, said closure member being mounted on and movable with the bucket and being adapted to close the bottom discharge aperture of the bucket when the closure member is in closed position.

20. In a conveyer system, an open-topped bucket having a bottom discharge aperture, means for conveying the bucket along a path, a discharge station positioned on the path, and including a discharge member adapted to form, with the discharge aperture of the bucket, a discharge passage for the material in the bucket when the bucket is aligned with the discharge station, a movable closure member located in said discharge passage, said closure member being normally in the open position when the bucket is aligned with the station, and means responsive to the accumulation of material at said station, adapted to maintain said closure member in closed position when a predetermined amount of material has accumulated at the station, and for thereby positively preventing discharge from the bucket, said closure member, when in closed position, closing the bottom discharge aperture of the bucket, the bucket having circumferential top edges lying in a plane parallel with the path of movement of the bucket, and means for filling said bucket to a level substantially flush with the top edges of the bucket.

NELSON L. DAVIS.